United States Patent
Lavoine-Hanneguelle

(10) Patent No.: US 9,434,908 B2
(45) Date of Patent: Sep. 6, 2016

(54) METHOD FOR EXTRACTING AN ODOROUS EXTRACT BY AN ALTERNATIVE SOLVENT TO CONVENTIONAL SOLVENTS

(75) Inventor: Sophie Lavoine-Hanneguelle, Mouans Sartoux (FR)

(73) Assignee: CHARABOT, Grasse (FR)

( * ) Notice: Subject to any disclaimer, the term of this patent is extended or adjusted under 35 U.S.C. 154(b) by 205 days.

(21) Appl. No.: 14/110,304

(22) PCT Filed: Apr. 6, 2012

(86) PCT No.: PCT/FR2012/000132
§ 371 (c)(1),
(2), (4) Date: Dec. 17, 2013

(87) PCT Pub. No.: WO2012/136908
PCT Pub. Date: Oct. 11, 2012

(65) Prior Publication Data
US 2014/0094527 A1    Apr. 3, 2014

(30) Foreign Application Priority Data
Apr. 8, 2011  (FR) ...................... 11 01085

(51) Int. Cl.
*C11B 9/02* (2006.01)
*A23L 1/221* (2006.01)
*B01D 11/02* (2006.01)

(52) U.S. Cl.
CPC .............. *C11B 9/025* (2013.01); *A23L 1/2215* (2013.01); *B01D 11/0288* (2013.01)

(58) Field of Classification Search
CPC ............................ C11B 9/025; A23L 1/2215
See application file for complete search history.

(56) References Cited

U.S. PATENT DOCUMENTS

| | | | |
|---|---|---|---|
| 5,942,597 A * | 8/1999 | Noda et al. | 528/361 |
| 7,576,049 B2 * | 8/2009 | Shaath et al. | 512/5 |
| 2006/0182689 A1 | 8/2006 | Dournel et al. | |

FOREIGN PATENT DOCUMENTS

| | | |
|---|---|---|
| EP | 0616821 | 9/1994 |
| EP | 1649926 | 4/2006 |
| FR | 2855069 | 11/2004 |
| GB | 2360470 | 9/2001 |
| WO | 02/36232 | 5/2002 |

OTHER PUBLICATIONS

International Search Report, PCT/FR2012/000132 (Aug. 16, 2012).
Meierhenrich, U.J. et al., "De la molecule à l'odeur: Les bases moléculaires des premières étapes de l'olfaction," (From a molecule towards an odour: the molecular basis of the first olfactory step), L'actualité chimique, Aug.-Sep. 2005, No. 289, pp. 29-40 (English abstract included).

\* cited by examiner

*Primary Examiner* — Ling Choi
*Assistant Examiner* — Lanee Reuther
(74) *Attorney, Agent, or Firm* — Thompson Hine LLP

(57) ABSTRACT

Methods for extracting an extract of volatile odorous compounds from an organic raw material containing odorous compounds is disclosed. The method includes contacting an organic raw material with dimethyl carbonate, as a solvent, in at least one bath at a temperature of 10° C. to 70° C. A liquid organic phase is obtained that includes the dimethyl carbonate charged with volatile odorous compounds and is collected. If the liquid organic phase comprises an immiscible aqueous phase, decanting occurs to separate the dimethyl carbonate charged with odorous compounds therefrom thereby eliminating the aqueous phase. Next, partially eliminating by evaporation forms a pre-concentrated extract of volatile odorous compounds, which is recovered and if water is present, decanting occurs to eliminate the water. Additionally, concentrating the pre-concentrated extract of volatile odorous compounds by evaporation is performed to obtain the extract of volatile odorous compounds.

20 Claims, No Drawings

METHOD FOR EXTRACTING AN ODOROUS EXTRACT BY AN ALTERNATIVE SOLVENT TO CONVENTIONAL SOLVENTS

This invention relates to a method for extracting an odorous extract from an organic raw material containing odorous compounds using an alternative solvent to conventional solvents. The invention also relates to odorous extracts thus obtained and uses of them.

It is generally known that natural extracts for use in aromas and perfumes are complex substances also called "Complex Natural Substances" for which the organoleptic properties are directly related to the fabrication method as well as to the quality of the raw materials from which they are derived.

Perfumes and aromas contained in plants are present in small quantities and it is well known that the molecules making up these aromas and perfumes are volatile and fragile to temperature changes.

If a substance is to have odorous properties, it must have a moderate molecular weight, weak polarity, some solubility in water, a high vapor pressure and it must be highly lipophilic. On the other hand, there is no need for it to have particular functional groups or to be chemically reactive (Meierhenrich et al., L'actualité chimique, August-September 2005, No. 289, pp 29-40).

Also, the preparation of such compounds of perfumes, fragrances and aromas from natural sources is not easy to achieve nor to reproduce regularly and may be very expensive.

For example, such compounds are isolated by extraction by entrainment with water vapor. However, this method denatures some odorous compounds and the quality and/or yield of the extracts obtained makes them unusable.

Apart from water vapor that is widely used in perfumery for extraction from plants, organic solvents have been necessary for perfumed or aromatic extracts.

Wine, and then fatty oils and solid grease (tallow) have been used with enfleurage. These solid oils, saturated by emanations from flowers, could be dissolved in ethyl alcohol to obtain an ointment concentrate.

These methods are very labor intensive and have been progressively abandoned to be replaced by direct extraction with volatile solvents.

Extraction methods using a volatile solvent of a compound or a composition starting from a plant raw material are also well known. Extraction by volatile solvents consists of dissolving the odorous plant material in a solvent that is then evaporated.

Plants are placed in extractors and are successively washed with solvents that will then charge odorous molecules, waxes and pigments. After decantation and filtration, the solvent is evaporated to obtain a strongly odorous paste specifically called concrete for fresh flowers and leaves, and resinoid for the material derived from treatment of dried plants (roots, mosses, etc.). Concrete can lead to a pure essence called absolute after a series of washings with alcohol and chilling.

This extraction technique using a volatile solvent was frequently used in the first half of the twentieth century with petroleum ether, benzene, and nowadays solvents such as hexane, cyclohexane, methylene chloride, ethyl acetate, isopropanol, acetone, methanol or ethanol are conventionally used.

However, solvents miscible in water such as isopropanol, acetone, methanol or ethanol are not used in conventional extraction on wet products because the water content in the product causes a loss of aroma prejudicial to the finish (entrainment of concentrated water in the form of water vapor that partially or completely deodorizes the extract).

For example, document U.S. Pat. No. 7,576,049 discloses the use of a volatile ester such as ethyl acetate for the extraction of aromatic compounds from plant material. This document in particular discloses very short extraction times between 15 seconds and about 10 minutes, to avoid extracting materials that might be incompatible when mixed with other aromatic compounds such as some essential oils.

However, it is well known in the business that ethyl acetate used as a pure extraction solvent results in products with acid, acetic (vinegary) notes that detract from the odor and can damage industrial facilities (corrosion, seals, etc.).

Thus, organoleptic characteristics are not optimal, since ethyl acetate tends to partially hydrolyze into acetic acid during the extraction cycle.

Therefore, solvents currently used for fabrication of concretes are the most nonpolar, based on hexane or cyclohexane, or mixes containing high proportions of them, and sometimes still on dichloromethane.

However, due to the toxicity of a petroleum solvent such as hexane, its toxic vapors make it particularly dangerous for manipulators (it is highly volatile) and precautions are necessary to prevent contact with the skin during use. The use of a petroleum solvent such as hexane or cyclohexane is also against all the principles of green chemistry.

Furthermore, nonpolar solvents such as methylene chloride or benzene are even more dangerous.

Furthermore, petroleum fractions like hexanes (various isomers) are never perfectly pure and the concentrated extracts obtained are more or less polluted by molecules, traces with alliaceous/greasy notes depending on the purity of the solvent used and the intrinsic power of the initial plant extract, due to low yields obtained with most plant concretes.

To achieve this, the composition and odor of the extracts obtained are significantly different from the raw material.

In general, there is a genuine demand to substitute traditional solvents and particularly petroleum solvents, by non-toxic solvents with sufficient volatility and good extraction properties, in terms of quality and yield.

Extraction by supercritical $CO_2$ can form an attractive alternative to the use of hexane. However, in practice it is very difficult to implement because it requires special equipment resistant to high pressures. Investments lead to high costs on the products obtained. It gives organoleptically excellent results but the products are usually high added value extracts. Therefore extraction by supercritical $CO_2$ is not a good alternative as a substitute for traditional solvents in existing standard industrial equipment.

Document EP0616821 also discloses the use of non-chlorinated fluorocarbon solvents.

Document WO02/36232 in particular discloses the use of an extraction solvent containing heptafluoropropane.

These two documents disclose in particular the advantages of using such solvents instead of classical solvents such as hexane in that they have lower boiling points. According to these documents, evaporation of the solvent at more than 60° C. heats the extract to temperatures at which volatile odorous molecules are lost and the extracts are denatured.

However, these compounds are detrimental to the ozone layer since they are particularly volatile. Furthermore, as organofluorides, they should not be used as a solvent.

Finally, document U.S. Pat. No. 5,942,597 discloses a polyhydroxyalcanoate extraction method and an oil (to be eliminated) starting from raw materials such as plants, and mentions dimethyl carbonate as one in a long list of polyhydroxyalcanoate solvents.

However, the solvent according to the invention is not mentioned among the list as a solvent of the oil to be eliminated. Furthermore, like oil commonly composed of triglycerides, polyhydroxyalcanoates extracted by this method are non-odorous, non-volatile compounds with a high molecular weight of more than 500 g/mol, and cannot be considered as volatile odorous compounds.

Proposals for substitution solvents usually concern non-volatile green solvents such as fatty substances, triglycerides or esters, glycerol carbonate), monoterpenes (limonene, pinenes) with boiling points that are too high, or molecules that are too polar (ethanol, butanol, isoamylic alcohol, fusel oils).

Considering the above, one problem that the invention is intended to solve is the use of a method for extracting an odorous extract from an organic raw material using an alternative non-toxic solvent not derived from petrochemistry, and that can be used in traditional extraction installations. Such a method is easy to use, it has at least the same and usually superior yields, and the odorous extracts thus obtained have the same odor as the raw material, and can be used as a perfume, perfume ingredient, for food flavoring or in the composition of a cosmetic product.

The method according to the invention has the following specific advantages not found in prior art:
  the method uses a non-toxic solvent, not necessarily derived from photochemistry;
  the method uses a solvent with sufficient volatility;
  the method uses a solvent with moderate polarity;
  the method uses a solvent with good affinity with the searched molecules with organoleptic interest;
  the method uses a solvent that is in the liquid phase at atmospheric pressure under classical extraction conditions, and is thus adapted to classical extraction installations;
  the method uses a solvent with a much higher dissolving power than hexane for the molecules of interest (aromas, perfumes) and consequently extraction temperatures and durations can be limited. This is an economic and ecological advantage;
  the method gives better yields than are possible with concretes and absolutes with traditional methods, while remaining sufficiently selective regarding volatile odorous molecules of interest;
  the odorous extracts obtained have almost the same odor as the plant, and can be used for making perfumes, and in cosmetics and food processing.

Therefore the first purpose of the invention is a method of extracting volatile odorous compounds from an organic raw material containing odorous compounds comprising steps in which: a) said organic raw material is brought into contact with dimethyl carbonate used as solvent in at least one bath at a temperature between 10° C. and 70° C. so as to charge said dimethyl carbonate solvent with volatile odorous compounds of said organic material to obtain a liquid organic phase; b) the liquid organic phase is collected from said bath; c) if the collected liquid organic phase comprises an aqueous phase that is immiscible with the dimethyl carbonate resulting from organic material, the liquid organic phase is decanted to separate the dimethyl carbonate charged with the volatile odorous compounds from said immiscible aqueous phase and the aqueous phase is eliminated; d) dimethyl carbonate is partially eliminated by evaporation and a preconcentrated extract of volatile odorous compounds is recovered; e) if the preconcentrated extract of volatile odorous compounds obtained after partial elimination of dimethyl carbonate by evaporation contains water, the preconcentrated extract is decanted to eliminate the water; and f) the preconcentrated extract of volatile odorous compounds is concentrated by evaporation to obtain the extract of volatile odorous compounds.

A second purpose of the invention is an extract of volatile odorous compounds prepared using the method according to the invention.

Finally, the third purpose of the invention is the use of an extract of volatile odorous compounds according to the invention for the preparation of a perfume as a perfume ingredient, as a food flavor or in the composition of a cosmetic product.

The invention and its resulting advantages will be better understood after reading the following description and the non-limiting embodiments.

The extraction method according to the invention is used to obtain an odorous extract from an organic raw material containing odorous compounds. The odorous extract according to the invention is particularly an extract of volatile odorous compounds, preferably an extract of volatile odorous compounds with a molecular weight of less than 350 g/mol.

Advantageously in addition to a low molecular weight of less than 350 g/mol, the volatile odorous compounds extracted according to the invention have an equally low polarity, some solubility in water, a high vapor pressure and are highly lipophilic. Furthermore, the presence of specific functional groups confers a special characteristic odor on the molecules.

An extract of volatile odorous compounds according to the invention is an extract that exhales an odor.

For the purposes of this invention, odor means any volatile chemical compound with a low molecular weight, preferably less than 350 g/ml, with organoleptic properties perceptible to olfactive cells and/or the taste organ in a sufficient concentration, even at a very low concentration.

Non-limiting, an odor may indifferently refer to any odor, even an unpleasant smell, and more particularly pleasant odorants characterizing pleasing odors such as a perfume, an aroma, a taste or a fragrance that characterizes successive odors, in olfactive strata.

An organic raw material containing odorous compounds refers to any material from which an odorous extract can be obtained by extraction. An organic raw material refers particularly to a plant raw material or a material such as beeswax. Preferably, a plant raw material is used.

Plants are photosynthetic organisms with walls composed of cellulose. In particular, plants include algae and all types of land plants such as mosses, ferns, flowering plants, trees, shrubs and grasses.

In the context of the method according to the invention, the entire plant or possibly specific parts of the plant such as the bark, leaves, flowers, the stem, roots, fruits, seeds, rhizomes or buds, or exudates, gum, sap, wax and derivatives are used as the plant raw material.

According to the invention, the plant raw material is used moist or freshly gathered or dried, milled or ground, or preferably semi-moist or dry (buds, seeds or pods).

Non-limiting examples of organic raw materials containing odorous compounds according to the invention include blackcurrant buds, mimosa, vanilla, maté, incense, tuberose, vetiver, jasmine, rose, myrrh, iris, benzoin, cacao, coffee, cistus, labdanum, fenugreek, hay, sandalwood, juniper, ginger, lavender, lavandin, mosses, nutmeg, ylang ylang, patchouly, peppers, saffron, tobacco, tea, tonka, geranium, cardamom and beeswax.

In a first step of the method according to the invention, the organic raw material is brought into contact with dimethyl carbonate used as solvent in at least one bath at a temperature between 10° C. and 70° C. so as to charge volatile organic odorous compounds of said organic material in said dimethyl carbonate compound and to obtain a liquid organic phase.

Dimethyl carbonate is not very dangerous and is not considered as toxic, particularly in comparison with petroleum solvents like benzene, hexane or cyclohexane.

Furthermore, dimethyl carbonate can be obtained from non-petroleum sources. Dimethyl carbonate is a non-toxic substance and consequently has non consequences on the environment. It acts as a solvent while minimizing risks of toxicity.

Dimethyl carbonate has moderate polarity similar to benzene, and is less nonpolar than hexane. Advantageously, dimethyl carbonate does not extract sugars and other highly polar molecules, and has an excellent affinity with required volatile odorous molecules.

When contact is made according to the invention, the organic raw material is placed for example in an extractor comprising dimethyl carbonate used as solvent and liquid at atmospheric pressure, immersed in the solvent at a moderate temperature of between 10 and 70°, the temperature depending on the quantity to be treated and varying depending on the nature of the plant to be extracted.

Advantageously, the moderate heat treatment is done as a function of ambient temperature conditions, preferably at a temperature of between 35 and 45° C.

The duration of the extraction bath according to the invention can vary up to a few hours, for example from 15 minutes to 10 hours and will have an influence on the olfactive profile of the odorous extract obtained.

Advantageously, the duration and temperature of the extraction bath according to the invention are optimized depending on the nature of the content, the duration preferably being between about 1 hour and about 4 hours, for a necessary and sufficient time to extract the volatile odorous compounds collected in the liquid organic phase and more particularly the dimethyl carbonate charged with volatile odorous compounds.

During the bath, the organic raw material may be worked statically, dynamically or while being stirred, or with circulation of the solvent for a given time, for example being gently stirred. Mixing thus results in a less saturated solvent that in turn facilitates extraction.

Advantageously, the solvent in the bath is circulated in a closed circuit, in other words the solvent is circulated over the organic raw material to create a movement in the extractor, for example without breaking the petals or by stirring ground seeds, and avoiding solvent saturation zones around the periphery of the plant.

Alternatively, baths can be made successively or concomitantly in several extractors depending on the quantity of organic raw material to be treated.

For example, it would be possible to make a single bath and then rinse with new extraction dimethyl carbonate, or several baths with the same organic raw material and possibly the same content can be passed on the same solvent volume several times, depending on saturation of the solvent for a raw material to solvent ratio by weight between 1:1 to 1:10, and preferably between 1:3 and 1:5.

The liquid organic phase is then collected from the bath. This is done by separating the liquid organic phase from the solid organic raw material, if applicable, to collect the liquid organic phase and more particularly the dimethyl carbonate charged with the volatile organic compounds, usually by drawing off the miscella, as is possible with standard extraction equipment.

Then, if the collected liquid organic phase comprises an aqueous phase that is immiscible with the dimethyl carbonate resulting from said organic raw material, the liquid organic phase is decanted to separate the dimethyl carbonate charged with the volatile odorous compounds from said immiscible aqueous phase obtained from the organic raw material and the aqueous phase is eliminated.

Advantageously, dimethyl carbonate is heavier than water with a density of 1.060 $g/cm^3$ at 20° C. and is not very soluble in water with a partial solubility of 139 g/L. Thus, during decantation of the liquid organic phase of the bath, the dimethyl carbonate charged with the volatile odorous compounds is distinctly separated from the immiscible aqueous phase resulting from the organic raw material. Therefore it is very easy to collect the solvent charged with the volatile odorous compounds and eliminate the aqueous phase during decantation of the bath.

According to one embodiment of the extraction method according to the invention and considering the density of dimethyl carbonate, water is decanted from the top and the solvent charged with the volatile odorous compounds is below the aqueous phase to be eliminated.

The fact that water covers the solvent can limit emanations that might affect manipulators during the manipulation. Manipulators who might come into contact with the volatile solvent can then use water to form a protective layer on the surface, and then eliminate it afterwards.

The fraction consisting of the dimethyl carbonate solvent charged with the volatile odorous compounds is then recovered by itself, and the aqueous fraction is eliminated.

A resulting aqueous phase is obtained when a moist or fresh plant is used as the organic raw material instead of a dry or partly moist plant for which at least 70% and typically about 85% of its total weight is water, for example before or after drying due to gathering. This aqueous phase tends to entrain unwanted sugars in the odorous extract according to the invention. Sugars are not extracted by pure dimethyl carbonate, but they are extracted in wet dimethyl carbonate, which is what happens when the content is very moist (fresh flowers) or wet (rain). An additional aqueous washing with limited volume may be envisaged if necessary to eliminate polar molecules not required according to the invention, for a concentrated perfuming extract.

Advantageously, a drying agent such as sodium sulfate or sodium chloride is used to eliminate the small quantity of water that might have been retained in the dimethyl carbonate solvent charged with the volatile odorous compounds. This is a drying operation. It is then filtered so as to collect only the dimethyl carbonate charged with the volatile odorous compounds with no water and advantageously with no sugars.

The dimethyl carbonate is then partially eliminated by evaporation and a preconcentrated extract of volatile odorous compounds is obtained.

If the preconcentrated odorous extract still contains any water after partial elimination of dimethyl carbonate by evaporation, the preconcentrated extract is decanted to eliminate the water.

Dimethyl carbonate naturally entrains 3% of residual water and is thus preconcentrated so that the final traces of water can be eliminated by a new decantation.

Finally, the preconcentrated odorous extract and particularly the dimethyl carbonate charged with the volatile odorous compounds is concentrated by evaporation to obtain the odorous extract composed of "concrete" or "resinoid" volatile odorous compounds.

Advantageously, the extraction method according to the invention can obtain an extract in which at least 3% and even more advantageously at least 10% of the total weight consists of volatile odorous compounds.

If a particularly dry organic raw material containing little or no water is used, advantageously there will be no need for a decantation step to eliminate water, or if a step is necessary, there will only be one. Also, advantageously no steps are necessary to partially eliminate the dimethyl carbonate by evaporation to obtain a preconcentrated odorous extract; only the organic phase collected from the bath by evaporation is concentrated directly to obtain the odorous extract according to the invention The volatility of dimethyl carbonate is sufficiently high so that the solvent can be eliminated well without denaturing volatile odorous compounds of interest and the odorous extract. It has a boiling point at atmospheric pressure (Pa) equal to 90° C.

Thus, the dimethyl carbonate is at least partially eliminated and/or the preconcentrated odorous extract is concentrated by evaporation at a temperature of less than or equal to 90° C.

Advantageously, evaporation under a vacuum or a partial vacuum can significantly reduce the evaporation temperature.

Preferably, the dimethyl carbonate is at least partially evaporated under a vacuum at a temperature of less than 70° C., more preferably at a temperature of less than 60° C. and even more preferably less than 50° C. or even 45° C.

Even more advantageously, the method according to the invention also comprises a step in which an alcohol or any other molecule forming an azeotrope with dimethyl carbonate is added to the dimethyl carbonate, before the dimethyl carbonate is eliminated and/or the preconcentrated odorous extract is concentrated by evaporation by azeotropic entrainment limiting aromatic losses.

Preferentially, a natural and non-toxic compound such as ethanol is added forming an azeotropic mix with dimethyl carbonate.

Dimethyl carbonate advantageously forms azeotropic mixes with water and with ethanol. These mixes have boiling temperatures of 78.4° C. and 75.3° C. respectively at atmospheric pressure. The boiling temperature is thus significantly lowered so as to eliminate the solvent by evaporation to obtain the odorous extract according to the invention without denaturing the volatile odorous compounds of interest.

For example, according to one preferred embodiment of the extraction method according to the invention, a quantity of between 1% and 100% of ethanol can be added before finishing to the concentrated content (ethanol in preference to methanol which is toxic but which could advantageously be used from a technical point of view with its azeotrope at 63.7° C. in dimethyl carbonate charged with volatile odorous compounds.

Preferably, azeotropic mixes are evaporated by concentration under a vacuum or partial vacuum. The formation of such an azeotropic mix combined with an atmosphere under a vacuum or a partial vacuum can lower the evaporation temperature of dimethyl carbonate to a moderate temperature less than or equal to 60° C., of the order of 55° C., 50° C., 45° C. or even 40° C.

This thus advantageously lowers the heating temperature and duration necessary to evaporate the dimethyl carbonate solvent and obtain the odorous extract according to the invention.

In the method according to the invention, an odorous extract is recovered composed of volatile odorous compounds, less fatty than concretes obtained traditionally, for which the odor faithfully reflects the native odor of the extracted organic raw material.

Such an odorous extract according to the invention may be a colored product from which most sugars have been eliminated, without any water, rich in volatile organic compounds and with excellent absolute yields. The absolute is the fraction soluble in ethanol 96 V/V. In the state of the art, it is obtained by dissolving the concrete (primary extract) with ethanol, chilling, filtration and/or decantation, filtration and then concentration under a vacuum or partial vacuum.

Some examples of organic raw materials containing volatile odorous compounds extracted using the method according to the invention are given below for illustrative purposes.

Blackcurrant Buds 5 kg of blackcurrant buds (*Ribes nigrum*) were picked in Burgundy in January 2011 and then shipped and extracted 48 hours after picking. These buds were placed in a basket extractor and then immersed in a dimethyl carbonate bath at 35° C. for 2 hours, the buds/dimethyl carbonate ratio being 1:3 by weight. The miscella (solvent+extract+water) or the liquid organic phase is drawn off. The buds are extracted twice using the same quantity of solvent, the second bath only lasting for 1 hour. The miscella is decanted for 5 minutes so as to separate the dimethyl carbonate charged with volatile odorous compounds from the immiscible aqueous phase obtained from the blackcurrant buds. The dimethyl carbonate charged with volatile odorous compounds is underneath the aqueous phase. The dimethyl carbonate charged with volatile odorous compounds is recovered by decantation. The dimethyl carbonate charged with volatile odorous compounds without any water is then filtered. It is then concentrated under a partial vacuum at 60° C. A half-volume of ethanol is added to the preconcentrated product and the azeotropic mix is heated to a temperature of 45° C. so as to completely evaporate the dimethyl carbonate and ethanol. Finally, the odorous extract obtained according to the invention is recovered.

The yield obtained is 7% by mass for all three baths. The extract obtained is a pasty mass that is dark brownish green in color and has a fruity odor characteristic of fresh blackcurrant buds.

Table 1 below shows at least the partial composition of volatile odorous compounds (calculated as a % of all the volatile compounds in the chromatogram) in the extract of blackcurrant buds according to the example, as demonstrated by nonpolar Gas Chromatography (GC) column.

TABLE 1

| Constituent | Retention Index | Blackcurrant bud extract according to the invention % GC |
| --- | --- | --- |
| alpha thuyene | 925 | 0.19 |
| sabinene | 963 | 0.19 |
| myrcene | 978 | 0.33 |
| delta3carene | 1006 | 2.80 |
| beta phellandrene | 1027 | 1.65 |

TABLE 1-continued

| Constituent | Retention Index | Blackcurrant bud extract according to the invention % GC |
|---|---|---|
| cis β ocimene | 1029 | 1.26 |
| trans β ocimene | 1040 | 0.84 |
| gamma terpinene | 1050 | 0.42 |
| trans sabinene hydrate | 1051 | 0.08 |
| tirpinolene | 1079 | 6.24 |
| para-cymen-8-ol | 1154 | 0.81 |
| butyrate cis-3-hexenyl | 1171 | 2.04 |
| α terpineol | 1176 | 0.18 |
| Eucervone * | 1223 | 0.18 |
| citronellol | 1211 | 0.37 |
| linalyl acetate | 1243 | 0.12 |
| bornyl acetate | 1273 | 0.71 |
| Thymol or carvarcrol? | 1284 or 1290 | 0.12 |
| alpha terpenyl acetate | 1333 | 0.36 |
| alpha copaene | 1378 | 0.29 |
| Hydroxycarvotanacetone (7712-46-1) | — | 0.08 |
| p hydroxyphenylethyl alcohol [501-94-0] | — | 0.18 |
| β caryophyllene | 1413 | 11.97 |
| aromadendrene | 1440 | 1.57 |
| α humulene | 1448 | 4.08 |
| alloaromadendrene | 1433 | 1.51 |
| γ murolene | 1469 | 0.70 |
| β selinene | 1492 | 0.44 |
| alpha selinene | 1483 | 1.37 |
| γ cadinene | 1511 | 0.51 |
| δ cadinene | 1516 | 0.91 |
| gamma selinene | 1512 | 0.59 |
| selinadiene3,7 (11) | 1523 | 0.53 |
| spathulenol | 1565 | 3.10 |
| caryo oxide | 1573 | |
| globulol | 1559 | 0.22 |
| humelene epoxide | 1585 | 0.57 |
| isospathulenol | 1597 | 0.44 |
| 6,10,14-trimethylpentadecan-2-one | 1830 | 0.46 |
| palmitic acid (MM = 256) | 1954 | 0.15 |
| hardwickiic acid (MM = 316) | — | nq |
| 4',5-dihydroxy-7-methoxyflavanone [520-29-6] (MM = 286) | — | 1.92 |

* identification attempt
nq: not quantified

Vanilla Pods:

5 kg of ground vanilla pods (*vanilla planifolia*) were placed in a stirred extractor and then immersed in a dimethyl carbonate bath at 45° C. for 2 hours, the pods/dimethyl carbonate ratio being 1:5 by weight. The miscella (solvent+extract+water) is drawn off. The pods are extracted twice using the same quantity of solvent, the second bath only lasting for 1 hour. The miscella is decanted for 5 minutes so as to separate the dimethyl carbonate charged with volatile odorous compounds from the immiscible aqueous phase obtained from the vanilla pods. The dimethyl carbonate charged with volatile odorous compounds is underneath the aqueous phase. The dimethyl carbonate charged with volatile odorous compounds is recovered by decantation. The dimethyl carbonate charged with volatile odorous compounds without any water is then filtered. It is then concentrated under a partial vacuum at 55° C. A half-volume of ethanol is added to the preconcentrated product and the azeotropic mix is heated to a temperature of 45° C. so as to completely evaporate the dimethyl carbonate and ethanol. Finally, the odorous extract obtained according to the invention is recovered.

The yield obtained is 15% by mass for all three baths. The extract obtained is a thick amber brown liquid with a soft, woody, sweet odor (vanilline) characteristic of vanilla pods.

Table 2 below shows at least the partial composition of volatile odorous compounds (calculated as a % of all the volatile compounds in the chromatogram) in the vanilla extract according to the example, as demonstrated by polar Gas Chromatography (GC) column.

TABLE 2

| Constituent | Retention Index | Vanilla extract according to the invention % GC |
|---|---|---|
| ethyl lactate | 1359 | 2.22 |
| butanediol | 1547 | 0.22 |
| diethyl succinate | 1689 | trace |
| trans-2-decenal | 1819 | |
| quaïacol | 1866 | 2.18 |
| phenol | 1942 | 0.46 |
| ethyl myristate | 2008 | trace |
| ethyl cinnamate | 2054 | trace |
| para vinyl quaiacol | 2113 | trace |
| anisic alcohol | 2200 | trace |
| ethyl palmitate | 2216 | 2.00 |
| homovanillic alcohol | 2286 | 0.57 |
| c23 alcane | 2300 | 0.44 |
| c24 alcane | 2400 | trace |
| ethyl stearate | 2460 | 0.54 |
| ethyl oleate + 4-ethoxymethyl phenol | 2474 | 1.73 |
| Vanilline (MM = 152) | 2505 | 43.57 |
| ethyl linoleate (MM = 308) | 2477 | 10.13 |
| ethyl linoleate (MM = 306) | 2519 | 0.49 |
| para hydroxybenzaldehyde (MM = 122) | 2958 | 3.18 |

Flowering Mimosa Sprays:

3 kg of fresh flowering mimosa sprays (*Acacia dealbata*) were picked from the Tanneron hills in France (Alpes Maritimes Department) in February 2011 and were then extracted within 12 hours after they were picked. These whole sprays were placed in a basket extractor and then immersed in a dimethyl carbonate bath at 35° C. for 2 hours, the sprays/dimethyl carbonate ratio being 1:5 by weight. The miscella (solvent+extract+water) is drawn off. The sprays are extracted twice using the same quantity of solvent, the second bath only lasting for 1 hour. The miscella is decanted for 5 minutes so as to separate the dimethyl carbonate charged with volatile odorous compounds from the immiscible aqueous phase obtained from the mimosa sprays. The dimethyl carbonate charged with volatile odorous compounds is underneath the aqueous phase. The dimethyl carbonate charged with volatile odorous compounds is recovered by decantation. The dimethyl carbonate charged with volatile odorous compounds without any water is then filtered. It is then concentrated under a partial vacuum at 45° C. A half-volume of ethanol is added to the preconcentrated product and the azeotropic mix is heated to a temperature of 40° C. so as to completely evaporate the dimethyl carbonate and ethanol. Finally, the odorous extract obtained according to the invention is recovered.

The extract yield obtained is 1.25% on the fresh plant.

The extract obtained is a dark green paste with a soft, anis odor characteristic of fresh mimosa flowers. It is observed that there are no greasy notes present in the hexanic concrete.

Table 3 below shows at least the partial composition of volatile odorous compounds (calculated as a % of all the volatile compounds in the chromatogram) in the mimosa extract according to the example, as demonstrated by non-polar Gas Chromatography (GC) column.

TABLE 3

| Constituent | Retention Index | Mimosa extract according to the invention % GC |
|---|---|---|
| Hexanoic acid | 980 | trace |
| Ethyl hexanoate | 976 | trace |
| Benzylic alcohol | 1010 | 0.82 |
| Heptanoic acid | 1069 | trace |
| Maltol | 1088 | 0.21 |
| Phenylethyl alcohol | 1096 | 0.27 |
| Ethyl benzoate | 1146 | trace |
| Heptanal diethyl acetal | 1177 | trace |
| Benzoic acid | 1152 | 7.99 |
| 2,3-dihydrobenzofurane | 1194 | 8.73 |
| Anisaldehyde | 1224 | trace |
| Anisic alcohol | 1267 | 0.26 |
| Resorcinol [108-46-3]* | — | 1.44 |
| Ethyl nonanoate | 1288 | trace |
| 2-methoxy-4-vinylphenol [7786-61-0] or p-methoxyacetophenone [100-06-1]* | — | 0.83 |
| Methyl anisate | 1337 | trace |
| Nonanal diethyl acetal | 1371 | trace |
| p-anisic acid | 1393 | 17.84 |
| Decanal diethyl acetal | 1467 | 0.73 |
| Alcane C15 | 1500 | 0.18 |
| Levoglucosan (patatoid) | — | 12.17 |
| C16 alcene | 1590 | 0.13 |
| C16 alcane | 1600 | trace |
| Heptadecadiene* | 1671 | trace |
| Heptadec-8-ene | 1684 | 9.11 |
| C17 alcane | 1700 | 1.50 |
| Benzyl benzoate | 1726 | trace |
| Myristic acid | 1748 | trace |
| Ethyl myristate | 1776 | trace |
| C18 alcane | 1800 | 0.29 |
| 6,10,14 trimethylpentadecan-2-one | 1830 | trace |
| C19 alcane | 1900 | 10.42 |
| Palmitic acid | 1954 | trace |
| Ethyl palmitate | 1976 | 2.43 |
| C20 alcane | 2000 | 0.60 |
| C21 alcane | 2100 | 2.91 |
| Ethyl linolenate (MM = 306) | 2153 | trace |
| C23 alcane (MM = 324) | 2300 | 1.46 |

*identification attempt

Incense Gum:

5 kg of drops (exudate) of ground incense (*Boswellia* sp.) were placed in a stirred extractor and then immersed in a dimethyl carbonate bath at 45° C. for 2 hours, the drops/dimethyl carbonate ratio being 1:3 by weight. The miscella (solvent+extract) or the liquid organic phase is drawn off. The drops are extracted three times using the same quantity of solvent, the third bath only lasting for 1 hour. The dimethyl carbonate charged with volatile odorous compounds is recovered by filtration and all dust is removed from it. It is then concentrated under a partial vacuum at 55° C. Finally, the odorous extract obtained according to the invention is recovered.

The yield obtained is 67% by mass for all four baths. The product obtained is a transparent very viscous amber-colored liquid with a woody, resinous odor characteristic of incense drops.

Table 4 below shows at least the partial composition of volatile odorous compounds (calculated as a % of all the volatile compounds in the chromatogram) in the incense gum extract according to the example, as demonstrated by nonpolar Gas Chromatography (GC) column.

TABLE 4

| Constituent | Retention Index | Incense gum extract according to the invention % GC |
|---|---|---|
| Tricyclene | 920 | 0.05 |
| α Thujene | 924 | 0.07 |
| α Pinene | 932 | 2.28 |
| Camphene | 945 | 0.05 |
| Verbenene | 948 | 0.06 |
| Sabinene | 968 | 0.27 |
| β Pinene | 972 | 0.57 |
| Myrcene | 983 | 0.41 |
| α Phellandrene | 997 | 0.04 |
| P Cymene | 1013 | 0.18 |
| Limonene | 1024 | 0.43 |
| c β Ocimene | 1024 | 0.07 |
| Octanol | 1057 | 0.14 |
| cis p-2,8-menthadien-1-ol [3886-780] * | 1101 | 0.12 |
| α Campholene aldehyde | 1107 | 0.16 |
| trans pinocarveol | 1133 | 0.38 |
| cis verbenol * | 1140 | 0.08 |
| cis verbenol | 1140 | 0.96 |
| Myrtenal | 1171 | 0.13 |
| Terpinenol-4 | 1164 | 0.05 |
| α Turpineol | 1174 | 0.52 |
| Verbenone | 1181 | 0.25 |
| Myrtenol | 1183 | |
| Octyl acetate | 1187 | 0.76 |
| t Carveol | 1200 | 0.13 |
| Decyl methyl ether | 1227 | 0.16 |
| Bornyl acetate | 1272 | 0.16 |
| α Copaene * | 1373 | 0.12 |
| β Bourbonene | 1381 | 0.16 |
| β Caryophyllene | 1413 | 0.13 |
| Guaiadiene-6,9 | — | 0.19 |
| α Gurjunene | 1410 | 0.05 |
| α Humulene | 1448 | 0.06 |
| Allo Aromadendrene | 1460 | 0.05 |
| γ muurolene | 1473 | 0.07 |
| β selinene | 1478 | 0.07 |
| γ Cadinene | 1511 | 0.26 |
| δ Cadinene | 1516 | 0.09 |
| α Elemol | 1533 | 0.08 |
| Caryophyllene oxide | 1568 | 0.28 |
| Viridiflorol | 1582 | 0.52 |
| Humulene epoxide | 1593 | 0.14 |
| Epi Cubenol | 1619 | 0.07 |
| τ muurolol | 1628 | 0.38 |
| α muurolol | 1637 | 0.11 |
| α eudesmol | 1652 | 0.13 |
| Abs Incense pic A? | — | 0.21 |
| Cembrene * | 1932 | 0.35 |
| Verticiol [70000-19-0] * | — | 0.17 |
| Cembrenol (MM = 290) | — | 1.26 |
| Incensol (MM = 306) | 2152 | 4.57 |

* identification attempt

Maté Leaves 3 kg of maté leaf fragments (*Ilex paraguariensis*, Paraguay) were placed in a stirred extractor and then immersed in a dimethyl carbonate bath at 45° C. for 2 hours, the leaf fragments/dimethyl carbonate ratio being 1:5 by weight. The miscella (solvent+extract) is drawn off. The content is extracted twice using the same quantity of solvent, the second bath only lasting for 1 hour. The dimethyl carbonate charged with volatile odorous compounds is recovered by decantation and all dust is removed. It is then concentrated under a partial vacuum at 50° C. Finally, the odorous extract obtained according to the invention is recovered.

The yield obtained is 9% by mass for all baths. The extract obtained is a grayish green paste that has an odor characteristic of mate leaves similar to the odor of green tea or hay.

Table 5 below shows at least the partial composition of volatile odorous compounds (calculated as a % of all the volatile compounds in the chromatogram) in the maté extract according to the example, as demonstrated by nonpolar Gas Chromatography (GC) column.

TABLE 5

| Constituent | Retention Index | Maté leaves extract according to the invention % GC |
|---|---|---|
| Hexanoic acid | 980 | 0.31 |
| Methylethylmaleimide [20189-42-8] | 1265 | 0.59 |
| p-hydroxybenzaldehyde | 1310 | trace |
| vanilline | 1348 | trace |
| α-ionine | 1424 | 0.12 |
| β-caryophyllene | 1413 | trace |
| Nerylacetone | 1431 | trace |
| β-ionone epoxide | 1459 | trace |
| β-ionine | 1476 | trace |
| Dihydroactinidolide [15356 -74-8] (benzofuranone derivative) | 1479 | 0.68 |
| t propenyltrimethylpyrazine | — | trace |
| 3,5-dimethoxy-4-hydroxybenzaldehyde (syringaldehyde) [134-96-3] | 1652 | 0.13 |
| 3-oxo-β-ionone | 1659 | trace |
| 4-hydroxy,3,5,6-trimethyl-4-(3-oxo-1-butenyl)-2-cyclohexen-1-one [77846-84-5] | — | 0.13 |
| Benzyl benzoate | 1726 | trace |
| Phenanthrene | 1742 | trace |
| Myristic acid | 1748 | trace |
| Cafeine | 1810 | 58.86 |
| Theobromine | 1910? | 0.33 |
| Palmitic acid | 1954 | 1.89 |
| Phytol | 2105 | 0.44 |
| Stearic acid * | 2200 | trace |
| 4,8,12,16-tetramethylheptadecan-4-olide * (MM = 324) | — | 0.59 |
| C24 alcane (MM = 338) | 2400 | 0.15 |

* identification attempt

May Rose:

2 kg of fresh roses (*Rosa centifolia*, France) were placed in an extractor and then immersed in a dimethyl carbonate bath at 25° C. for 2 hours, the flower/dimethyl carbonate ratio being 1:3 by weight. The miscella (solvent+extract) is drawn off. The content is extracted twice using the same quantity of solvent. Washings with dimethyl carbonate charged with volatile odorous compounds and from which plant debris has been removed are recovered by filtration and drying on a drying salt such as sodium sulfate. It is then concentrated under a vacuum of 150 to 200 mbars at 50° C., with the addition of ethanol at the end of concentration. Finally, the odorous extract obtained according to the invention is recovered.

The yield obtained is 0.63% by mass for all the baths. This extract is a dark red pasty mass with a scent of rose petals. It can be dewaxed traditionally using ethanol (washings, chilling, filtration, concentration) to obtain a rose absolute. The absolute yield on the extract and on the flowers are 79% and 0.5% (compared with 0.3% traditionally) respectively.

Table 6 below shows at least the partial composition of volatile odorous compounds (calculated as a % of all the volatile compounds in the chromatogram) in the rose extract according to the example, as demonstrated by nonpolar Gas Chromatography (GC) column.

TABLE 6

| Constituent | Retention Index | Rose extract according to the invention % GC |
|---|---|---|
| Benzylic acid | 1010 | 1.43 |
| linalol | 1086 | trace |

TABLE 6-continued

| Constituent | Retention Index | Rose extract according to the invention % GC |
|---|---|---|
| Phenylethylic alcohol | 1096 | 34.58 |
| Nerol | 1214 | 0.26 |
| citronellol | 1212 | 4.80 |
| Phenylethyl acetate | 1225 | trace |
| phenyl acetic acid | 1248 | trace |
| geraniol | 1238 | 1.19 |
| 1,2-ethanediol,1-phenyl | | 0.13 |
| phenylethylic proprionate | 1327 | trace |
| Citronellyl acetate | 1334 | trace |
| Eugenol | 1330 | 0.66 |
| Geranyl acetate | 1363 | trace |
| Geranic acid | 1347 | 0.99 |
| Methyl Eugenol | 1373 | 0.52 |
| trans Caryophyllene | 1419 | trace |
| Alpha quaïene | 1446 | trace |
| α humulene | 1449 | trace |
| Germacrene D | 1476 | trace |
| C15 alcane (pentadecane) | 1500 | trace |
| Delta quaïene | 1495 | trace |
| C16 alcane (hexadecane) | 1600 | trace |
| C17 alcane (heptadecene) | 1695 | trace |
| C17 alcane (heptadecane) | 1700 | 0.36 |
| trans farnesol | 1716 | 0.14 |
| C18 alcane (octadecane) | 1800 | trace |
| C19 alcene (nonadecene) | 1894 | 1.02 |
| C19 alcane (nonadecane | 1900 | 4.20 |
| C20 alcene (eicosene) | 1994 | 0.14 |
| C20 alcane (eicosane) | 2000 | 0.55 |
| C21 alcene (heneicosene) | 2095 | 0.11 |
| C21 alcane (heneicosane) | 2100 | 3.01 |
| C22 alcane (docosane) | 2200 | 0.13 |
| C23 alcenes | 2290 | 0.53 |
| C23 alcane (tricosane) | 2300 | 1.30 |
| C22 alcane (docosane) | 2200 | 0.13 |
| C23 alcenes (MM = 322) | 2290 | 0.53 |
| C23 alcane (tricosane) (MM = 324) | 2300 | 1.30 |

Green Cardamom:

1.5 kg of ground cardamom seeds (*Elletaria cardamomum*) were placed in a stirred extractor and then immersed in a dimethyl carbonate bath at 45° C. for 2 hours, the cardamom seed/dimethyl carbonate ratio being 1:6 by weight. The miscella (solvent+extract) or the liquid phase is drawn off. The content is extracted twice, the first time using 6 kg and the second time using 3 kg of dimethyl carbonate; for one hour for each bath. The dimethyl carbonate charged with volatile odorous compounds is recovered by filtration. It is then dried and concentrated under a vacuum of 150 to 200 mbars at a temperature of 50° C. Finally, the odorous extract obtained according to the invention is recovered.

The yield obtained is 7% by mass for all the baths.

Table 7 below shows at least the partial composition of volatile odorous compounds (calculated as a % of all the volatile compounds in the chromatogram) in the green cardamom extract according to the example, as demonstrated by nonpolar Gas Chromatography (GC) column.

TABLE 7

| Nonpolar column constituent | Retention Index | Green cardamom extract according to the invention % GC |
|---|---|---|
| α Thujene | 924 | trace |
| α Pinene | 932 | 0.12 |
| Camphene | 945 | trace |
| Sabinene | 967 | 1.6 |
| β Pinene | 971 | 0.12 |
| Myrcene | 983 | 1.12 |
| P Cymene | 1013 | trace |

TABLE 7-continued

| Nonpolar column constituent | Retention Index | Green cardamom extract according to the invention % GC |
|---|---|---|
| 1,8-cineol (eucalyptol) ** | 1021 | 1.44 |
| Limonene ** | 1024 | 24.08 |
| c β Ocimene | 1024 | trace |
| t β Ocimene | 1036 | 0.04 |
| γ Terpinene | 1050 | 0.06 |
| t Sabinenen Hydrate | 1056 | 0.33 |
| octanol-1 | 1055 | 0.12 |
| Terpinolene | 1079 | trace |
| cis sabinene hydrate | 1095 | 0.28 |
| Linalol | 1086 | 0.27 |
| T 4,8-Dimethyl-1,3,7-Nonatriene | 1106 | 0.22 |
| δ Terpineol | 1150 | 0.11 |
| Methyl 2-Octenoate | — | |
| Terpinenol-4 | 1164 | 0.37 |
| trans-4-decenal | 1177 | 0.07 |
| α Terpineol | 1174 | 0.76 |
| Octyl acetate | 1187 | 0.1 |
| cis Sabinene Hydrate acetate | 1214 | 2.23 |
| Neral | 1215 | 0.1 |
| Linalyl acetate | 1243 | 1.38 |
| Geraniol | 1238 | 0.93 |
| Geranial | 1245 | 0.26 |
| Methyl geraniate | — | 0.21 |
| α Terpinyl acetate | 1332 | 52.03 |
| Neryl acetate | 1343 | trace |
| Methyl cinnamate | 1365 | 0.13 |
| Vanilline | 1379 | trace |
| Geranyl acetate | 1363 | 0.86 |
| β Elemene | 1386 | 0.15 |
| Terpinyl propionate | 1405 | 0.11 |
| Germacrene D | 1476 | 0.1 |
| β Selinene | 1478 | 1.49 |
| α Selinene | 1488 | 0.57 |
| γ Cadinene | 1511 | 0.23 |
| t Nerolidol | 1550 | 0.8 |
| t,t-Farnesol | 1716 | 0.05 |
| t,t-Farnesal | 1715 | 0.09 |
| t,t-Farnesyl acetate | 1814 | 0.04 |
| C23 alcane (MM = 324) | 2300 | 0.09 |

* identification attempt
** resolved on polar column

Furthermore, table 8 below shows the contents of volatile odorous compounds with a molecular weight of less than 350 g/mol, in odorous extracts extracted according to the invention from the plant raw materials as described in the above examples. These concentrations of volatile odorous compounds are given by weight as a proportion of the total weight of the extract.

TABLE 8

| Raw material | Content of volatile odorous compounds by weight as a proportion of the total weight of the extract according to the invention |
|---|---|
| Incense | 14.6% |
| Maté | 3.2% |
| Mimosa | 10.2% |
| Blackcurrant buds | 9.3% |
| Cardamom | 56.8% |
| Vanilla | 11.1% |
| Rose | 17.5% |

Table 9 below contains a comparison between the yields of odorous extracts extracted according to the invention from different plant raw materials as described in the above examples and yields from a traditional concrete obtained by extraction with hexane.

TABLE 9

| Raw material | Hexanic concrete | Dimethyl carbonate (DMC) |
|---|---|---|
| Blackcurrant buds | 5.5% ± 0.2 | 7.0% ± 0.2 |
| Mimosa | 0.85% ± 0.05 | 1.25% ± 0.05 |
| Vanilla | 12% ± 0.5 | 15% ± 0.5 |
| Maté | 6% ± 0.2 | 9% ± 0.2 |
| Incense | 55% ± 1 | 67% ± 1 |

Thus, as illustrated above, the method according to the invention gives better yields than can be obtained with the traditional extraction method using hexane starting from the same plant raw materials.

Thus, the method according to the invention can obtain an odorous extract extracted from an organic raw material, preferably a plant material, using dimethyl carbonate not derived from the petrochemicals industry, and that respects the principles of green chemistry and that has absolutely not the same impact on human health, and especially it is not carcinogenic, mutagenic or reprotoxic.

According to another aspect, the invention relates to an extract of volatile odorous compounds, preferably an extract of volatile odorous compounds with a molecular weight of less than 350 mol/g, prepared using the method according to the invention.

As exemplified above, such odorous extracts are very difficult to characterize because even for a single species, they vary depending on many factors such as the plant raw material used, the place of harvesting and the year of the harvest, the equipment used for fabrication and settings to this equipment (vacuum, temperature, duration).

The extract according to the invention advantageously comprises at least 3% of volatile odorous compounds by weight of the total weight of the extract, and advantageously at least 10%.

The perfuming extract obtained may advantageously be transformed into absolute using methods according to the state of the art with yields superior than can be obtained with conventional concretes obtained using petroleum solvents such as hexane, since dimethyl carbonate is more polar. The mass balance of the plant in absolute is particularly advantageous.

The extract obtained according to the invention by extraction with dimethyl carbonate, or the absolute obtained from it, can advantageously be fractioned by molecular distillation to obtain a lighter extract with a higher concentration of odorous molecules.

The odorous extract according to the invention can also be used as a food flavor or in the composition of a cosmetic product.

Examples of cosmetic compositions include compositions such as a gel, a cream, a milk, a lotion, an oil, a shampoo or a soap, intended for a topical application, particular on the skin.

Obviously, the invention is not limited to the embodiments and examples mentioned above and those skilled in the art could make other embodiments not explicitly described and that are within the scope of the invention, using routine operations.

The invention claimed is:
1. A method for extracting an extract of volatile odorous compounds from an organic raw material containing odorous compounds, the method comprising:
contacting said organic raw material with dimethyl carbonate used as solvent in at least one bath at a temperature between 10° C. and 70° C. so as to charge said dimethyl carbonate solvent with volatile odorous compounds of said organic material to obtain a liquid organic phase;

collecting the liquid organic phase from said bath;

if the collected liquid organic phase comprises an aqueous phase that is immiscible with the dimethyl carbonate resulting from organic material, decanting the liquid organic phase to separate the dimethyl carbonate charged with the volatile odorous compounds from said immiscible aqueous phase; wherein the aqueous phase is eliminated;

partially eliminating by evaporation the dimethyl carbonate, subsequently, decanting to eliminate water, and then, recovering a preconcentrated extract of volatile odorous compounds;

adding an alcohol or other molecule to the preconcentrated extract of volatile odorous compounds to form an azeotropic mixture with the dimethyl carbonate; and concentrating the preconcentrated extract of volatile odorous compounds by evaporation of the azeotropic mixture to obtain an extract of volatile odorous compounds.

2. The method according to claim 1, in which the extracted volatile odorous compounds have a molecular weight of less than 350 g/mol.

3. The method according to claim 1, in which the bath is made with circulation of the solvent and may be static, dynamic or stirred, for a final raw material/solvent ratio by weight of 1:1 to 1:10.

4. The method according to claim 1, wherein contacting the organic raw material with dimethyl carbonate includes contact for between 15 minutes and about 10 hours.

5. The method according to claim 1, wherein eliminating the dimethyl carbonate and concentrating the preconcentrated extract of volatile odorous compounds includes heating to a temperature of less than or equal to 90° C.

6. The method according to claim 5, in which evaporation is done under a vacuum or partial vacuum.

7. The method according to claim 1, wherein the alcohol includes ethanol.

8. The method according to claim 1, wherein concentrating the preconcentrated extract of volatile odorous compounds comprises evaporating the azeotropic mixture under vacuum or partial vacuum at a temperature of less than or equal to 60° C.

9. An extract of volatile odorous compounds prepared according to claim 1.

10. The extract according to claim 9, in which extracted volatile odorous compounds have a molecular weight of less than 350 g/mol.

11. A composition comprising the extract of volatile odorous compounds prepared according to claim 1.

12. The composition of claim 11, further comprising a medium for the extract of volatile odorous compounds to be applied as a perfume.

13. The composition of claim 11, further comprising an edible medium.

14. The composition of claim 11, further comprising a suitable cosmetic medium.

15. The method of claim 1, further comprising transforming the extract of volatile odorous compounds into an absolute.

16. The method of claim 1, wherein the extract of volatile odorous compounds comprises at least 3% volatile odorous compounds by weight of the total weight of the extract.

17. The method of claim 1, wherein the extract of volatile odorous compounds comprises at least 10% volatile odorous compounds by weight of the total weight of the extract.

18. A method for extracting an extract of volatile odorous compounds from an organic raw material containing odorous compounds, the method comprising:

contacting said organic raw material with dimethyl carbonate used as solvent in at least one bath at a temperature between 10° C. and 70° C. so as to charge said dimethyl carbonate solvent with volatile odorous compounds of said organic material to obtain a liquid organic phase;

collecting the liquid organic phase from said bath, the organic phase comprising an aqueous phase immiscible with the dimethyl carbonate;

decanting the aqueous phase to eliminate the aqueous phase from the dimethyl carbonate charged with the volatile odorous compounds;

after elimination of the aqueous phase, partially eliminating by evaporation the dimethyl carbonate and, then, recovering a preconcentrated extract of volatile odorous compounds;

adding an alcohol or other molecule to the preconcentrated extract of volatile odorous compounds to form an azeotropic mixture with the dimethyl carbonate;

if the preconcentrated extract of volatile odorous compounds, obtained after partially eliminating the dimethyl carbonate by evaporation, contains water, decanting the preconcentrated extract to eliminate the water before adding the alcohol or other molecule to form the azeotropic mixture; and concentrating the preconcentrated extract of volatile odorous compounds by evaporation of the azeotropic mixture to obtain an extract of volatile odorous compounds.

19. The method according to claim 18, in which the extracted volatile odorous compounds have a molecular weight of less than 350 g/mol.

20. The method according to claim 18, wherein eliminating the dimethyl carbonate and concentrating the preconcentrated extract of volatile odorous compounds includes heating to a temperature of less than or equal to 90° C. under a vacuum or partial vacuum.

* * * * *